United States Patent [19]

Cenker et al.

[11] 4,029,611

[45] June 14, 1977

[54] CARBODIIMIDE-ISOCYANURATE FOAMS MODIFIED WITH POLYFURFURYL ALCOHOL POLYMERS

[75] Inventors: Moses Cenker, Trenton; Thirumurti Narayan, Riverview; John Thomas Patton, Jr., Wyandotte, all of Mich.

[73] Assignee: BASF Wyandotte Corporation, Wyandotte, Mich.

[22] Filed: Dec. 18, 1975

[21] Appl. No.: 642,163

[52] U.S. Cl. .................... 260/2.5 AW; 260/2.5 BE; 260/2.5 BF
[51] Int. Cl.² ....................................... C08G 18/54
[58] Field of Search ................. 260/2.5 BE, 2.5 BF, 260/2.5 AW

[56] References Cited

UNITED STATES PATENTS

| | | | |
|---|---|---|---|
| 3,509,103 | 4/1970 | Teague | 260/2.5 BE |
| 3,585,156 | 6/1971 | Hall | 260/2.5 BE |
| 3,865,757 | 2/1975 | Wade | 260/2.5 BE |
| 3,887,501 | 6/1975 | Narayan | 260/2.5 AW |
| 3,894,972 | 7/1975 | Narayan | 260/2.5 AW |

*Primary Examiner*—C. Warren Ivy
*Attorney, Agent, or Firm*—Joseph D. Michaels; Bernhard R. Swick; Robert E. Dunn

[57] ABSTRACT

Rigid cellular foams are prepared by catalytically condensing an organic polyisocyanate in the presence of (a) a carbodiimide-promoting catalyst, (b) a trimerization catalyst, and (c) a polyfurfuryl alcohol polymer. The resulting foam compositions are characterized by carbodiimide and isocyanurate linkages and exhibit improved friability and flame retardancy.

10 Claims, No Drawings

CARBODIIMIDE-ISOCYANURATE FOAMS MODIFIED WITH POLYFURFURYL ALCOHOL POLYMERS

BACKGROUND OF THE INVENTION

1. Field of the Invention

The present invention relates to cellular foams characterized by carbodiimide and isocyanurate linkages. More particularly, the invention relates to foams prepared by catalytically condensing an organic polyisocyanate in the presence of certain catalysts and a polyfurfuryl alcohol polymer.

2. Prior Art

The preparation of foams characterized by carbodiimide and isocyanurate linkages is well known in the art. These foams can be prepared by condensing an organic polyisocyanate with a catalyst which promotes both carbodiimide and isocyanurate linkages or with a co-catalyst system, one catalyst promoting carbodiimide linkages and another promoting isocyanurate linkages. Representative of such teachings are the disclosures found in U.S. Pat. Nos. 3,645,923; 3,657,161; 3,717,596; 3,723,366; 3,746,709; 3,806,475; 3,887,501 and 3,894,972.

SUMMARY OF THE INVENTION

The present invention relates to cellular foams having improved friability and flame retardancy properties. The foams are prepared by catalytically condensing an organic polyisocyanate in the presence of a compound that promotes carbodiimide linkages, a trimerization catalyst, and from 5% by weight to about 100% by weight, preferably from 10% to 50% by weight, based on the weight of the organic polyisocyanate, of a polyfurfuryl alcohol polymer.

DESCRIPTION OF THE PREFERRED EMBODIMENTS

In accordance with the present invention cellular foams are prepared by the catalytic condensation of an organic polyisocyanate in the presence of certain catalysts and a polyfurfuryl alcohol polymer. The polyfurfuryl alcohol polymers of use in the subject invention are well known in the art. They may be prepared by (1) the condensation of furfuryl alcohol or (2) the condensation of furfuryl alcohol with formaldehyde, furfural, urea or mixtures thereof. Generally, the condensations are conducted in the presence of an acid catalyst and at a temperature of from 25° C. to 120° C. until the desired degree of polymerization is achieved. The polymer is then neutralized and the water is removed to yield substantially anhydrous products. The Brookfield viscosity of the polyfurfuryl alcohol polymers may vary from 500 to 500,000 cps. at 25° C. and may have molecular weights ranging from 196 to 3000.

The acid catalysts employed for the condensation include sulfuric acid, hydrochloric acid, oxalic acid and phosphoric acid and the reaction is generally conducted in the pH range of 1 to 4, preferably 1.5 to 3, at a temperature of about 25° to 120° C., preferably 80° to 105° C.

As mentioned above, the catalyst system employed in the present invention comprises a compound which promotes carbodiimide linkages and a trimerization catalyst. Representative compounds which promote carbodiimide linkages include aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N', N'-tetrakis(2-hydroxypropyl)ethylene diamine and s-triazine compounds such as 2,4,6-tris(diethanolamino)-s-triazine, 2,4,6-tris(diisopropanolamino)-s-triazine, 2,4,6-tris-(N-methylethanolamino)-s-triazine, and unsymmetrically substituted triazines of the formula:

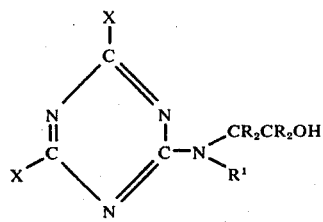

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpipeazyl. Since the triazines are unsymmetrically substituted, it is apparent that each X cannot concurrently be

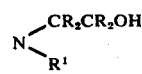

wherein each R and $R^1$ is the same. Generally from about 0.1 part to 10 parts of carbodiimide-promoting compound per 100 parts of organic polyisocyanate will be employed in the subject invention.

Trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris(dimethylaminomethyl)phenol; o-, p- or a mixture of o- and p-dimethylaminomethylphenol, triethylene diamine or the alkylene oxide and water adducts thereof, alkali metal carboxylates, alkali metal alkoxides, and organic boron-containing compounds. These compounds are well known in the art, as is their use as catalysts which promote isocyanurate linkages.

1,3,5-Tris(N,N-dialkylaminoalkyl)-s-hexahydrotriazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine is presumably a quaternary ammonium hydroxide. These compounds are generally prepared by reacting equimolar amounts of the hexahydrotriazine, alkylene oxide and water at a temperature of from about 10° C. to 80° C. for a period of from about five minutes to two hours. Preferred within this group of compounds is the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)phenol are known compounds which are commercially available products sold by Rohm & Haas under the trade names DMP-30 and DMP-10. Triethylenediamine and the alkylene oxide and water adducts thereof are also well known.

The amount of trimerization catalyst which may be employed in the present invention is generally from 0.1 part to 20 parts of catalyst per 100 parts of organic polyisocyanate.

The organic polyisocyanate used in the preparation of the foams in accordance with the present invention corresponds to the formula:

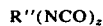

$$R''(NCO)_z$$

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxy-phenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenyl-methane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate of mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group, and one —OH group as well as those which contain an amino group and a —SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\beta$-hydromuconic acid, $\beta$-hydromuconnic acid, $\alpha$-butyl-$\alpha$-ethyl-glutaric acid, $\alpha$, $\beta$-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from 2 to 6 carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp.

257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diamino-toluene; aliphatic polyamines such as ethylenediamine, 1,3-propylenediamine, 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639 and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541 and 3,639,542. As is clear from the above, the particular polyol ingredient employed in the preparation of the quasi-prepolymer is not a critical aspect of the present invention. Any compound containing at least two reactive hydrogen atoms may be so used.

In one embodiment of the present invention, the condensation of the organic polyisocyanate is carried out in the presence of a polyol. Any of the polyols discussed above in connection with the preparation of the quasi-prepolymers may be employed in the process of the subject invention. Generally from 0.01 to 0.5 equivalent of a polyol having an average functionality of 2 to 8 and an average hydroxyl equivalent of from about 100 to about 3000 will be employed in the process of the subject invention. The use of a polyol results in foams of reduced friability without any loss of flame retardancy. If a polyol is employed in the invention, a catalytic amount of a urethane-promoting catalyst may also be employed. These catalysts are well known in the art and include the metal or organo-metallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, methylmorpholine, trimethylpiperazine, and N-ethylmorpholine may also be employed as well as mixtures of any of the above. Preferred urethane-promoting catalysts are the tin salts of carboxylic acids, such as dibutyltin dilaurate and dibutyltin diacetate. Generally, the amount of the urethane-promoting catalyst employed will be from 0.01 part to 10 parts per 100 parts of organic polyisocyanate.

The carbon dioxide-blown foams of the present invention are prepared by mixing together the organic polyisocyanate and the catalyst at an initiating temperature which, depending on the catalyst, will range from about 0° to 50° C. Under such conditions almost immediately an exotherm is developed within the reaction system, carbon dioxide is generated and foam formation begins. Alternatively, the foams may be prepared by adding the catalyst to the mixture of polyisocyanate and an auxiliary blowing agent. Optionally, a polyol is blended with the catalyst and added to the mixture of polyisocyanate and the auxiliary blowing agent.

The present invention also contemplates the incorporation of additional ingredients in the foam formulation to tailor the properties thereof. Thus, plasticizers, such as tris(2-chloroethyl) phosphate, surfactants, such as the silicone surfactants, e.g., alkylpolysiloxanes and polyalkyl siloxanes, may be employed in the invention. Further additional ingredients include auxiliary or supplemental blowing agents, such as water or halohydrocarbons. Also, inorganic fillers, pigments and the like can be used.

In any event, the foams prepared in accordance herewith are rigid cellular products having a density of from about 1 pound to 40 pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621, the flame retardant properties by ASTM D-3014 and the friability properties by ASTM C-421.

EXAMPLES I—XI

A. Preparation of Polymer A

A reaction vessel equipped with a reflux condenser, mechanical stirrer, and addition funnel was charged with 2250 parts (23 moles) of furfuryl alcohol, 1125.0 parts (14 moles) of 37% aqueous formaldehyde solution and 29 ml. of 9N phosphoric acid (50% aqueous solution). The reaction contents were gradually heated to reflux temperature (100° C) and maintained at that temperature for 1.5 hours. Heating was withdrawn and sodium hydroxide was added until the pH attained 6.5–7. Thereafter, the product was stripped at 100° C. and under less than ten millimeters of mercury to yield 1800 parts of product having a water content of 0.21% and a Brookfield viscosity of 660 cps. at 25° C.

B. Preparation of Polymer B

A reaction vessel equipped with an addition funnel, reflux condenser, thermometer, and mechanical stirrer was charged with 1960 parts (20 moles) of furfuryl alcohol, 814.0 parts (10 moles) of 37% aqueous formaldehyde solution and an aqueous solution of 15.6 parts of oxalic acid (10% aqueous solution). The pH of the solution was 2.2. The contents were heated to 99° C., at which point mild reflux began. The reaction contents were maintained at that temperature for about 2 hours and 5.4 parts of triethanolamine was added. The pH of the reaction contents was 6. At this stage, 50 parts of a 40% aqueous urea solution was added (temperature 90° C.) during a period of 15 minutes. The resulting product was stripped at 90° C. under less than 10 millimeters of mercury to yield 1724 parts of product. The Brookfield viscosity value of the product was 6650 cps. at 25° C. and the water content was 0.28%.

C. Preparation of Foams

A series of foams was prepared by simultaneously adding the above described polymers and catalysts to a reaction vessel equipped with a high speed stirrer to which had been charged a polyisocyanate, a surfactant, a plasticizer and a blowing agent. An exotherm was generated and foam formation followed soon after. Table I, below, illustrates the details of the preparations as well as physical properties of the resulting foams. In Table I the following abbreviations are employed:

PAPI — polymethylene polyphenylisocyanate
TDH — 1,3,5-tris(N,N-dimethylaminopropyl)-hexahydrotriazine
DBTA — dibutyltin dilaurate
F-11B — monofluorotrichloromethane
DC-193 — polyalkylsiloxane-polyoxyalkylene copolymer, a foam stabilizer
FYROL CEF — tris(2-chloroethyl)phosphate
MeOH — methanol

TABLE I

| Example | PAPI | TDH | DBTDA | FYROL CEF | DC-193 | MeOH | Polymer A | Polymer B | F-11B | Density pcf. | Comp. Str. 10% Def. psi. | Tumb. Friab. % Wt. Loss | Closed Cell Corr. % | Butler Chimney Test % Wt. Ret. | Butler Chimney Test Flame Ht. in. | Butler Chimney Test Time to SX sec. |
|---|---|---|---|---|---|---|---|---|---|---|---|---|---|---|---|---|
| I | 300 | 4.5 | 1.5 | 4.5 | 3 | 4.5 | 30 | — | 40 | 2.1 | 26 | 67 | 95 | 93 | 7 | 10 |
| II | 300 | 4.5 | 1.5 | 4.5 | 3 | 4.5 | 30 | — | 40 | 2.0 | 26 | 58 | 97 | 93 | 7 | 10 |
| III | 300 | 4.5 | 1.5 | 4.5 | 3 | 4.5 | 45 | — | 40 | 1.9 | 21 | 38 | 94 | 93 | 6 | 10 |
| IV | 300 | 4.5 | 1.5 | 4.5 | 3 | 4.5 | 45 | — | 40 | 1.8 | 19 | 42 | 97 | 92 | 6 | 10 |
| V | 300 | 4.5 | 1.5 | 4.5 | 3 | 4.5 | 60 | — | 40 | 1.7 | 13 | 39 | 97 | 89 | 9 | 10 |
| VI | 300 | 4.5 | 1.5 | 4.5 | 3 | 4.5 | — | 30 | 45 | 2.0 | 25 | 54 | 94 | 93 | 6 | 10 |
| VII | 300 | 4.5 | 1.5 | 4.5 | 3 | 4.5 | — | 30 | 45 | 2.0 | 26 | 72 | 96 | 93 | 6 | 10 |
| VIII | 300 | 4.5 | 1.5 | 4.5 | 3 | 4.5 | — | 45 | 40 | 1.9 | 18 | 55 | 112 | 92 | 6 | 10 |
| IX | 300 | 4.5 | 1.5 | 4.5 | 3 | 4.5 | — | 45 | 40 | 2.1 | 24 | 62 | 93 | 93 | 6 | 10 |
| X | 300 | 4.5 | 1.5 | 4.5 | 3 | 4.5 | — | 60 | 40 | 2.1 | 24 | 59 | 95 | 91 | 6 | 10 |
| XI | 300 | 4.5 | 1.5 | 4.5 | 3 | 4.5 | — | 60 | 40 | 2.0 | 23 | 59 | 96 | 92 | 6 | 10 |

The embodiments of the invention in which an exclusive property or privilege is claimed are defined as follows:

1. A cellular foam characterized by carbodimide and isocyanurate linkages prepared by catalytically condensing an organic polyisocyanate in the presence of (a) a carbodiimide-promoting catalyst; (b) a trimerization catalyst, and (c) from 5 to 100% by weight, based on the weight of the organic polyisocyanate of a polyfurfuryl alcohol polymer.

2. The foam of claim 1 wherein the polyfurfuryl alcohol polymer has a Brookfield viscosity at 25° C. of from 500 to 500,000 cps. and a molecular weight of from 196 to 3000.

3. The foam of claim 1 wherein the organic polyisocyanate is selected from the group consisting of toluene diisocyanate, methylene diphenyl diisocyanate, polyphenyl polymethylene polyisocyanate and mixtures thereof.

4. The foam of claim 1 wherein the carbodiimide-promoting catalyst is methanol.

5. The foam of claim 1 wherein the trimerization catalyst is 1,3,5-tris(N,N-dimethylaminopropyl)-s-hexahydrotriazine.

6. The foam of claim 1 carried out in the presence of from 0.01 to 0.5 equivalent of a polyol having an average functionality of 2 to 8 and an average hydroxyl equivalent of from about 100 to 3000.

7. The foam of claim 6 carried out in the presence of a catalyst which promotes urethane linkages.

8. The foam of claim 7 wherein the catalyst which promotes urethane linkages is dibutyltin diacetate or dibutyltin dilaurate.

9. The foam of claim 1 carried out in the presence of a fluorocarbon blowing agent.

10. The foam of claim 1 carried out in the presence of tris(2-chloroethyl) phosphate.

* * * * *